US008601788B2

(12) United States Patent
Crosta et al.

(10) Patent No.: US 8,601,788 B2
(45) Date of Patent: Dec. 10, 2013

(54) DUAL FLOW TURBOSHAFT ENGINE AND IMPROVED HOT FLOW NOZZLE

(75) Inventors: Franck Crosta, Leguevin (FR); Damien Prat, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 667 days.

(21) Appl. No.: 12/602,081

(22) PCT Filed: May 22, 2008

(86) PCT No.: PCT/FR2008/000706
§ 371 (c)(1),
(2), (4) Date: Nov. 25, 2009

(87) PCT Pub. No.: WO2009/004143
PCT Pub. Date: Jan. 8, 2009

(65) Prior Publication Data
US 2010/0186369 A1  Jul. 29, 2010

(30) Foreign Application Priority Data
May 31, 2007  (FR) .................................. 07 03861

(51) Int. Cl.
*F02K 3/02* (2006.01)
*F02K 1/00* (2006.01)
(52) U.S. Cl.
USPC ............... 60/226.1; 60/231; 60/262; 60/770; 239/265.17
(58) Field of Classification Search
USPC ............. 60/226.1, 231, 262, 770; 239/127.3, 239/265.17
See application file for complete search history.

(56) References Cited

U.S. PATENT DOCUMENTS

| 3,546,882 A | * | 12/1970 | Berkey | 60/204 |
| 4,163,366 A | * | 8/1979 | Kent | 60/226.1 |
| 7,886,520 B2 | * | 2/2011 | Stretton et al. | 60/266 |
| 2008/0271431 A1 | | 11/2008 | Porte | |

FOREIGN PATENT DOCUMENTS

| EP | 1 004 759 | 5/2000 |
| FR | 2 892 152 | 4/2007 |

OTHER PUBLICATIONS

International Search Report dated May 13, 2009 w/ English translation.
Written Opinion of the International Searching Authority with English translation, Dated Jan. 11, 2010.

* cited by examiner

*Primary Examiner* — William H Rodriguez
*Assistant Examiner* — Arun Goyal
(74) *Attorney, Agent, or Firm* — Dickinson Wright PLLC

(57) ABSTRACT

An improved bypass turbojet engine includes a particularly shaped hot flow nozzle arranged about a particularly shaped type of boss. The boss is bulbous in shape and is connected by a first connecting surface to a turbine casing. The hot flow nozzle is formed as a single skin that extends in a rearward direction from an engine cowl, with the hot flow nozzle being connected to the engine cowl along a second connecting surface. The hot flow nozzle and the bulbous boss are positioned relative to one another to delimit a nominal nozzle throat section and a nominal outlet section for hot flow from a hot flow generator. The hot flow nozzle single skin is also approximately bulbous in shape and widens from the second connecting surface in a direction toward the engine cowl's external wall.

3 Claims, 2 Drawing Sheets

US 8,601,788 B2

DUAL FLOW TURBOSHAFT ENGINE AND IMPROVED HOT FLOW NOZZLE

FIELD OF THE INVENTION

The present invention relates to improvements to aircraft turbojet engines.

BACKGROUND OF THE INVENTION

More specifically, the present invention relates to bypass (dual flow) turbojet engines comprising:
- a nacelle delimiting, at the front, an air intake and axially containing a cold flow fan and a hot flow generator provided with a turbine enclosed in a casing ending, at the rear, in a bulbous boss connected to said turbine casing along a first connecting surface;
- an engine cowl containing said hot flow generator and comprising:
  - an external wall delimiting with said nacelle a cold flow duct ending, at the rear, in a cold flow nozzle, and
  - an internal wall delimiting with said turbine casing a hot flow duct,
- a hot flow nozzle extending said engine cowl rearward by being connected thereto along a second connecting surface and collaborating with said boss to delimit a nominal nozzle throat section and a nominal outlet section for said hot flow, and
- at least one ventilation opening positioned between said external wall of said engine cowl and said hot flow nozzle, on the outside with respect to said cold flow nozzle, and intended to discharge to the outside a ventilation air flow bled from said cold flow and introduced into said engine cowl in order to regulate the temperature of said hot flow generator.

In turbojet engines of this type, said hot flow nozzle is therefore subjected to the cold flow on the external side and to the hot flow on the internal side, and comprises an external skin that is optimized for the flow of the cold flow and an internal skin that is optimized for the flow of the hot flow.

A double-skinned structure such as this is therefore relatively heavy and, in addition, because of the substantial temperature difference between the hot flow and the cold flow, behaves like a bimetallic strip and undergoes deformations that detract from the optimization of the flows of the hot and cold flows in flight, particularly in cruising flight.

It is an object of the present invention to overcome these disadvantages.

To this end, according to the invention, a turbojet engine of the type recalled hereinabove is noteworthy in that:
- said hot flow nozzle consists of a single skin;
- said single skin is shaped to encourage said cold flow to flow when the aircraft is in cruising flight; and
- the shape of said bulbous boss is tailored in order to be able to respect said nominal nozzle throat section and said nominal outlet section for said hot flow.

The present invention is based on the following observations:
- that for most of the time that an aircraft turbojet engine is in use it is in cruising flight and that it is therefore advantageous to optimize the rear part of such a turbojet engine for cruising flight;
- that in cruising flight, the flow of the cold flow of such a turbojet engine is a supersonic flow, whereas the flow of the hot flow is a subsonic flow; and
- that optimizing the flow of the supersonic cold flow is more critical than optimizing the flow of the subsonic hot flow, and that optimizing the flow of said cold flow can be taken almost exclusively into consideration provided that the nominal nozzle throat section and nominal outlet section are respected for said hot flow.

Thus, according to the present invention, these observations are put to good use to create the hot flow nozzle in the form of a single skin, something which, by comparison with a double-skin embodiment, provides a weight saving and avoids bimetallic strip effect deformations.

In order to avoid excessive disruption to the hot flow, it is also advantageous to ensure that the shape of said single skin avoids any separation of said hot flow.

Advantageously, along the axis of the turbojet engine, the shape of said single skin varies continuously. Said single skin is bulbous in shape, for example, widening from said second connecting surface into the continuation of said external wall of said engine cowl.

SUMMARY OF THE INVENTION

Of course, the position of said ventilation opening, between the rear edge of the external wall of the engine cowl and said part of said single skin continuing this external wall, depends on the shape of said single skin.

As a preference, said ventilation opening is created in the vicinity of the largest-diameter part of said single skin.

Obviously, the present invention is particularly easy to implement in turbojet engines in which said hot flow nozzle throat coincides with said hot flow outlet, because then only one nominal section has to be respected.

The figures of the attached drawing make it easy to understand how the invention may be embodied. In these figures, identical references denote similar elements.

DETAILED DESCRIPTION OF THE INVENTION

Figure 2:
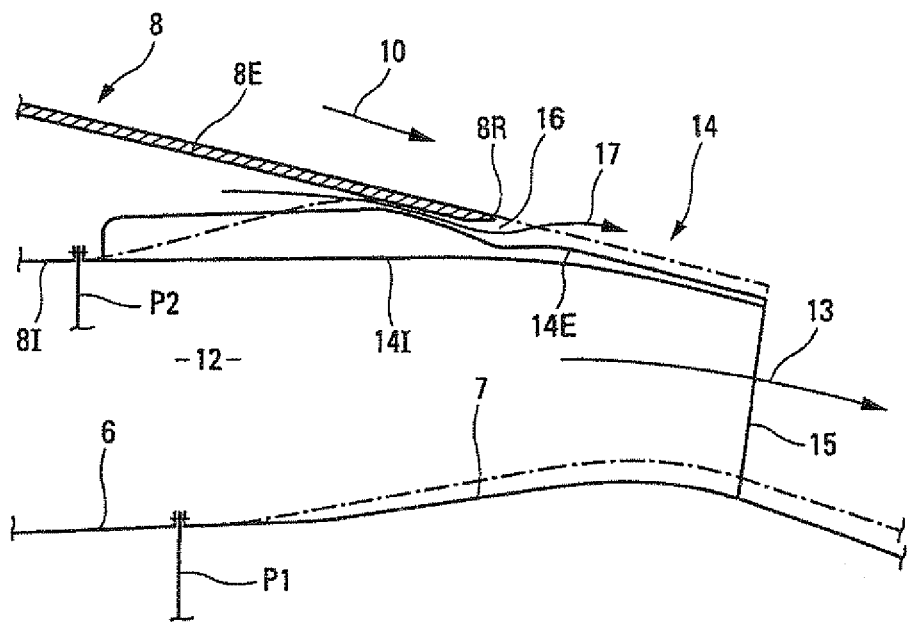
FIG. 2 shows, in an enlarged and partial axial section, a known configuration for the rear part of the hot flow duct of the turbojet engine of FIG. 1.

In FIG. 2, said rear part according to the present invention has been superposed, in chain line, on said known configuration for comparison purposes.

Figure 3:
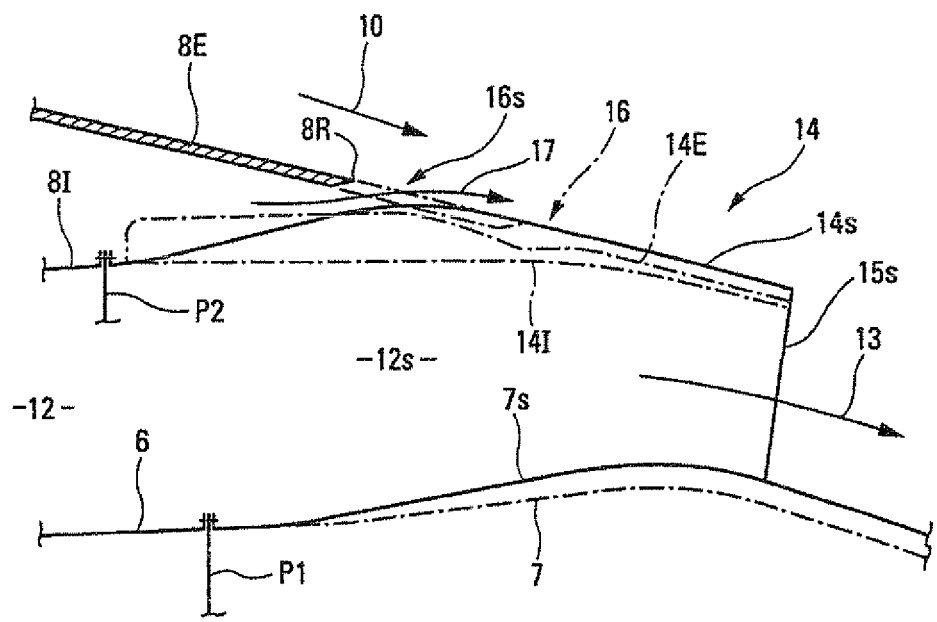
FIG. 3 shows, in a view comparable with that of FIG. 2, one example of a configuration according to the present invention, for the rear part of said hot flow duct of the turbojet engine of FIG. 1.

Symmetrically, and likewise for the purposes of comparison, FIG. 3 depicts said known rear part in chain line superposed on said configuration according to the present invention.

Figure 1:
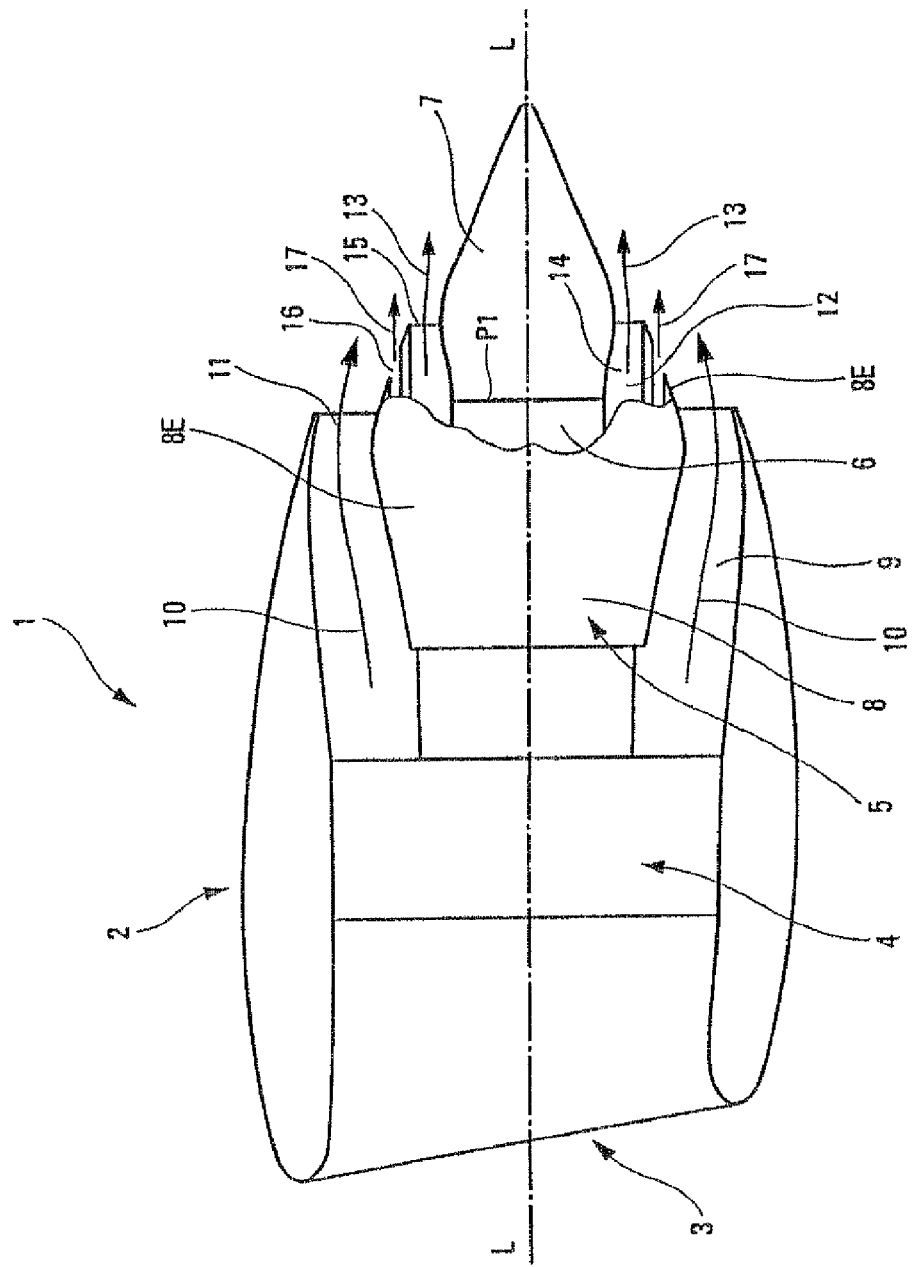
FIG. 1 is a schematic view with cutaway, partially in axial section, of a turbojet engine affected by the present invention.

The bypass turbojet engine 1 of axis L-L, depicted schematically and partially in FIG. 1 and intended to power an aircraft (not depicted), comprises a nacelle 2 delimiting, at the front, an air intake 3. The nacelle axially contains a cold flow fan 4 and a hot flow generator 5. The hot flow generator 5 is provided with a turbine enclosed in a casing 6 ending, at the rear, in a bulbous boss 7, and fixed to said casing 6 along a connecting surface or joining plane P1. The hot flow generator 5 is enclosed in a cowl 8 comprising an external wall 8E and an internal wall 81 (see FIG. 2).

The external wall BE of the cowl 8 delimits with the nacelle 2 a duct 9 for the cold flow, symbolized by the arrows 10, said cold flow duct 9 ending in a cold flow nozzle 11. The internal wall 8I delimits, with the turbine casing 6, a duct 12 for the hot flow, symbolized by the arrows 13.

The cowl 8 of the hot flow generator 5 is extended rearward by a hot flow nozzle 14 that collaborates with said boss 7 to extend said duct 12 as far as the annular outlet orifice 15 for the hot flow 13. The hot flow nozzle 14 is attached to the rear end of the internal wall 81 along a connecting surface or joining plane P2 and created between the rear edge 8R of the external wall 8E and said nozzle 14 is an annular opening 16 positioned on the outside with respect to the cold flow nozzle 11 and intended to discharge to the outside a flow of ventilation air symbolized by the arrows 17, bled from the cold flow 10 and introduced into the cowl 8 of the hot flow generator 5 in order to regulate the temperature thereof.

In the known embodiment depicted in solid line in FIG. 2, it is assumed that the annular outlet orifice 15 for the hot flow 13 additionally forms the throat of the nozzle 14. Furthermore, the latter consists of an external wall 14E over which the cold flow 10 flows and of an internal wall 141 over which the hot flow 13 flows.

When the aircraft bearing the turbojet engine 1 is in cruising flight, the cold flow 10 is supersonic, whereas the hot flow 13 is subsonic.

The object of the present invention illustrated schematically by FIG. 3 is chiefly to lighten the hot flow nozzle 14 and prevent the deformations thereof that are due to the bimetallic strip effect of said walls 14E and 141 while at the same time not in any way detracting from the performance of said turbojet engine when the aircraft is in cruising flight.

To do that, said nozzle 14 consists of a single skin 14s shaped to encourage the flow of the supersonic cold flow 10 when the aircraft is in cruising flight. The shape of the single skin 14s varies continuously along the axis L-L and can be likened to a bulbous shape widening from the joining plane P2 into the continuation of the external wall BE of the engine cowl 8, creating therewith an opening 16s comparable to the opening 16.

In order, as far as the hot flow is concerned, to respect the nominal section of the nozzle throat and the nominal outlet section—which sections, in the example depicted, coincide with the hot flow outlet orifice 15s—the shape of the boss 7 is modified as depicted as 7s. Thus, inside the nozzle 14, the hot flow duct 12 adopts the shape 12s.

The shape of the single skin 14s has to be such that, in its concave portion facing toward the boss, there is no separation of said hot flow 13.

It may be that, in order to give the single skin 14s its optimal shape, the ventilation opening 16 has to be shifted to 16s, as depicted in FIG. 3. The position 16s of said ventilation opening is advantageously in the vicinity of the largest-diameter part of the single skin 14s.

The invention claimed is:

1. A bypass turbojet engine for an aircraft, provided with a longitudinal axis, said bypass turbojet engine comprising:
a nacelle delimiting, at a front portion of the turbojet engine, an air intake and axially containing a cold flow fan for generating a cold flow and a hot flow generator for generating a hot flow, with a turbine casing ending at a rear portion of the turbojet engine, and with a bulbous boss being connected to said turbine casing along a first connecting surface;
an engine cowl containing said hot flow generator, wherein said engine cowl comprises:
an external wall delimiting with said nacelle a cold flow duct, in which the cold flow duct is configured for flowing the cold flow generated by the cold flow fan and ends at a rear portion of the engine cowl, forming a cold flow nozzle, and
an internal wall delimiting with said turbine casing a hot flow duct configured for flowing the hot flow generated by the hot flow generator;
a hot flow nozzle extending from said internal engine cowl wall in a rearward direction, with the hot flow nozzle being connected to the internal engine cowl wall along a second connecting surface and positioned relative to said bulbous boss to delimit a nominal nozzle throat section and a nominal outlet section for the hot flow to flow from said hot flow generator, and
at least one ventilation opening positioned between said external wall of said engine cowl and said hot flow nozzle, with said at least one ventilation opening being outside said cold flow nozzle, and configured to discharge to the outside of the turbojet engine a ventilation air flow, bled from said cold flow generated from said cold flow fan and into said engine cowl, to temperature regulate said hot flow generator,
wherein:
said hot flow nozzle extending from said internal engine cowl wall is formed as a single skin having an external wall over which the ventilation air bled from the cold flow flows and an internal wall over which the hot flow flows, wherein said single skin is bulbous in shape, widening in diameter continuously along the longitudinal axis from said second connecting surface in a direction toward said external wall of said engine cowl, and said single skin is configured to include a concave shaped portion facing toward the bulbous boss in which there is no separation of the hot flow through the hot flow duct;
said ventilation opening is at a largest-diameter part along the single skin; and
said bulbous boss connected to said turbine casing is configured relative to said single skin to form said nominal nozzle throat section and said nominal outlet section of said hot flow nozzle.

2. The turbojet engine as claimed in claim 1, wherein said hot flow nozzle throat coincides with said hot flow outlet.

3. A hot flow nozzle for a bypass turbojet engine for an aircraft, wherein said bypass turbojet engine is provided along a longitudinal axis and comprises:
a nacelle delimiting, at a front portion of the turbojet engine, an air intake and axially containing a cold flow fan for generating a cold flow and a hot flow generator for generating a hot flow, with a turbine casing ending at a rear portion of the turbojet engine, and with a bulbous boss being connected to said turbine casing along a first connecting surface;
an engine cowl containing said hot flow generator, wherein said engine cowl comprises:
an external wall delimiting with said nacelle a cold flow duct, in which the cold flow duct is configured for flowing the cold flow generated by the cold flow fan and ends at a rear portion of the engine cowl, forming a cold flow nozzle, and
an internal wall delimiting with said turbine casing a hot flow duct configured for flowing the hot flow generated by the hot flow generator;
a hot flow nozzle extending from said internal engine cowl wall in a rearward direction, with the hot flow nozzle being connected to the internal engine cowl wall along a second connecting surface and positioned relative to said bulbous boss to delimit a nominal nozzle throat section and a nominal outlet section for the hot flow to flow from said hot flow generator, and at least one ventilation opening positioned between said external wall of said engine cowl and said hot flow nozzle, with said at least one ventilation opening being outside said cold flow nozzle, and configured to discharge to the outside of the turbojet engine a ventilation air flow, bled from said cold flow from said cold flow generated from said cold flow fan and into said engine cowl, to temperature regulate said hot flow generator, wherein:

said hot flow nozzle extending from said internal engine cowl wall is formed as a single skin having an external wall over which the ventilation air bled from the cold flow flows and an internal wall over which the hot flow flows, wherein said single skin is bulbous in shape, widening in diameter continuously along the longitudinal axis from said second connecting surface in a direction toward said external wall of said engine cowl, and said single skin is configured to include a concave shaped portion facing toward the bulbous boss in which there is no separation of the hot flow through the hot flow duct;

said ventilation opening is at a largest-diameter part along the single skin; and said bulbous boss connected to said turbine casing is configured relative to said single skin to form said nominal nozzle throat section and said nominal outlet section of said hot flow nozzle.

* * * * *